United States Patent
Jacobsen et al.

(12) 
(10) Patent No.: US 6,732,416 B1
(45) Date of Patent: May 11, 2004

(54) REFRIGERATOR RECYCLING METHOD AND SYSTEM

(75) Inventors: Terry Jacobsen, Snohomish, WA (US); Michael Dunham, Lake Forest, CA (US)

(73) Assignee: Jaco Environmental, Inc., Snohomish, WA (US)

( * ) Notice: Subject to any disclaimer, the term of this patent is extended or adjusted under 35 U.S.C. 154(b) by 0 days.

(21) Appl. No.: 10/080,153

(22) Filed: Feb. 19, 2002

(51) Int. Cl.[7] .................. B23P 19/04; B23P 17/04; B23P 21/00
(52) U.S. Cl. ................. 29/403.3; 29/403.1; 29/711
(58) Field of Search ................ 29/403.3, 403.1, 29/403.4, 426.3, 426.5, 426.6, 711; 62/298, 149, 292

(56) References Cited

U.S. PATENT DOCUMENTS 5,074,477 A * 12/1991 Welter et al. ............... 241/18

* cited by examiner

*Primary Examiner*—John C. Hong
(74) *Attorney, Agent, or Firm*—James G. O'Neill; Klein O'Neill & Singh, LLP

(57) ABSTRACT

A system and method for recycling materials from appliances, such as refrigerators and freezers, including a conveyor system having a number of stations to remove material from the appliance, and a band saw to cut the appliance into at least two pieces. The cut pieces of the appliance are taken apart to separate a metal shell and plastic interior from polyurethane foam. The polyurethane foam is placed in sealed bags, palletized, shrink-wrapped and shipped to an incinerator for burning to eliminate outgassing of CFC-11 to the atmosphere.

20 Claims, 1 Drawing Sheet

REFRIGERATOR RECYCLING METHOD AND SYSTEM

BACKGROUND OF THE INVENTION

1. Field of the Invention

Figure 1:
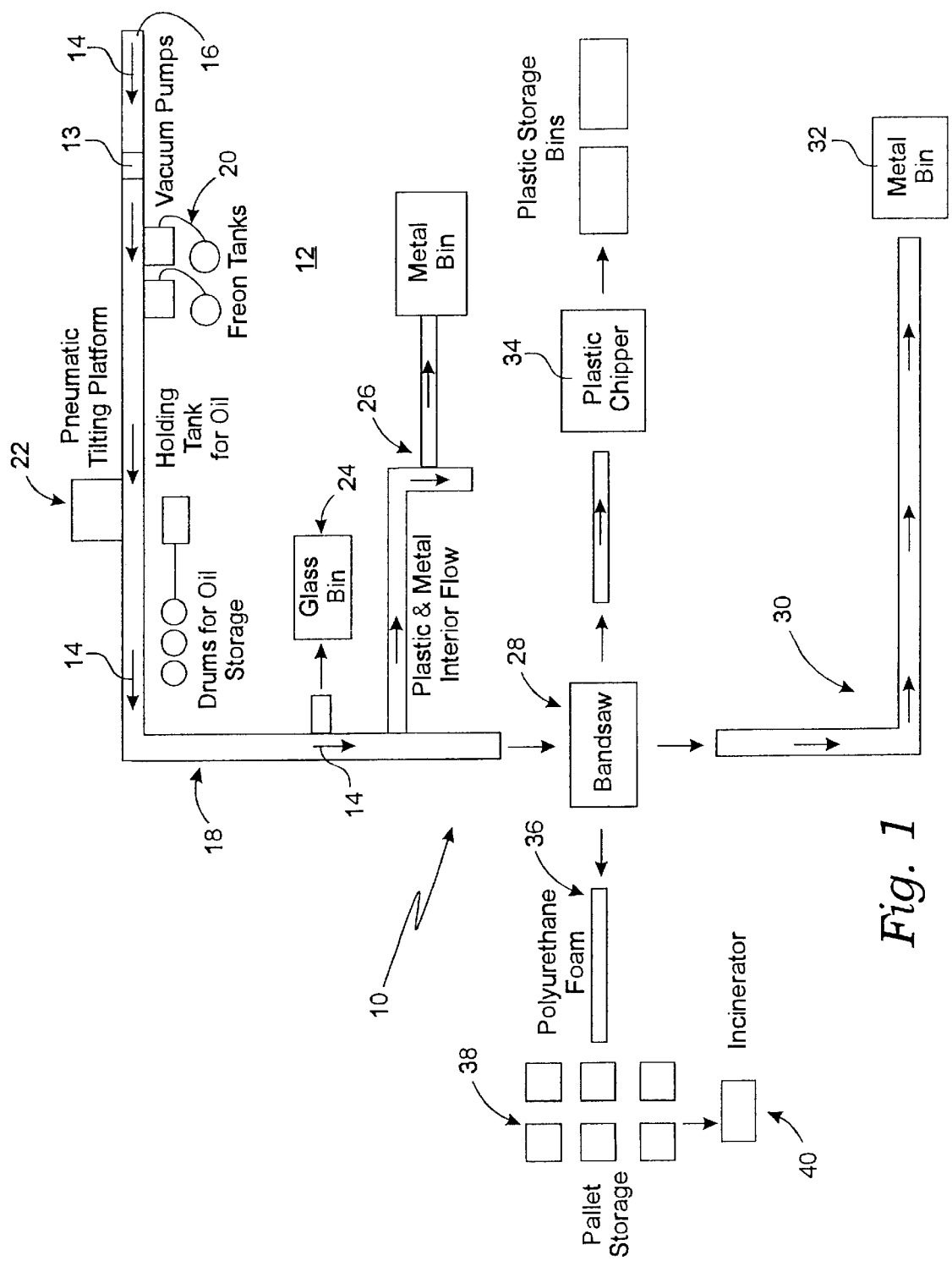

This invention generally relates to recycling systems, and more particularly, to an improved and more efficient method and system for separating and recycling the materials in freezers and refrigerators.

2. Description of the Prior Art

It is well known that many household appliances, such as freezers and refrigerators, contain toxic materials that must be separated and removed and recycled or destroyed. Various techniques and processes have heretofore been employed in order to recycle portions of freezers and refrigerators. However, none of the known techniques or processes are successful in recycling or destroying R-11.

Large quantities of CFC-11 are stored in rigid cell foams, notably polyurethane foam or R-11 used for insulation of refrigerators, freezers and the like. The CFC-11 is used as a foam-blowing agent in the manufacture of polyurethane. The CFC-11 slowly outgasses from polyurethane, with an estimated half-life of 100–300 years and is a known contributor to ozone depletion. Heretofore, in an attempt to prevent the outgassing of CFC-11, the R-11 was pulverized. However, since the remaining CFC-11 in the R-11 is so strongly bonded to the foam, pulverization leaves two waste streams containing CFC-11 and pulverized foam with CFC-11 still attached. If sent to a landfill, this pulverized foam will eventually release the ozone depleting CFC-11 into the atmosphere as it decomposes. Therefore, the existing systems do not remove sufficient amounts of CFC-11 from R-11, nor are they applicable to a refrigerator and freezer recycling program.

The present invention provides improvements in destroying CFC-11 contained in R-11 and recycling and recovering other materials from refrigerators and freezers in an efficient and cost-effective manner. This is accomplished by utilizing a system that achieves a 90% material recovery rate and packages the R-11 for transport to an incinerator where it is destroyed. The refrigerators and/or freezers to be recycled are placed on a platform and the platform is loaded on a conveyor or roller transport system. The refrigerator or freezer is then moved through a plurality of stations in the system where various materials therein are removed or drained. The refrigerator or freezer is then placed horizontally on a platform and sent to a large band saw where the remaining housing is cut into a number of pieces to allow the metal shell and interior plastic pieces to be stripped away. The contaminated polyurethane foam is then removed and packaged for shipment to an incinerator for proper disposal of the R-11.

Therefore, it can be seen that the present invention meets an existing need in the art for an improved and more efficient method and system for eliminating CFC-11 held in R-11 and more effectively recycling appliances, such as refrigerators and freezers.

SUMMARY OF THE INVENTION

Accordingly, It is a general object of the present invention to provide an improved system for recycling appliances. It is a particular object of the present invention to provide an improved system for more efficiently recycling the materials in refrigerators or freezers. It is another particular object of the present invention to provide an improved method for removing polyurethane foam from refrigerators and freezers and packaging the foam for shipping to an incinerator. It is yet another particular object of the present invention to provide an improved method for achieving substantially improved recycling of approximately 90% of the materials utilized in a refrigerator or freezer.

These and other objects and advantages of the present invention are achieved by providing a method and system for recycling appliances comprising a conveyor system, a plurality of stations to remove material from the platform 13, preferably in a vertical or upright position, and the holder or platform placed on the conveyor system 10 for movement in the direction of the arrows 14. The conveyor, system 10 may be of any desired width, such as approximately two feet, to accommodate the platform 13 and refrigerator loaded thereon. The platform 13 is preferably about 2 feet square and may be of any desired thickness, such as approximately ½ inch thick plywood or plastic, so as to be easily carried along the system 10 as the refrigerator or other appliance thereon is moved through the system to remove and recover the materials therein.

The platform 13 and refrigerator are placed on the system 10 at a starting point or end 16 in a first portion or section 18. The platform 13 and refrigerator or other appliance are moved to a first station 20 where refrigerant, such as freon, is evacuated from the refrigerator in any acceptable or known manner and pumped into tanks for shipping to a recycling/cleaning facility.

A compressor in the refrigerator or other appliance has a hole formed therein, as by drilling. The hole is of sufficient size to enable the compressor to be drained, and the platform 13 and refrigerator are moved to a second station 22 having a pneumatic tilting platform to tilt the platform 13 and refrigerator to an angle of approximately 20 degrees. A tube, or the like, is inserted in the drilled hole and the oil in the compressor pumped out into a holding tank and placed in EPA approved drums, preferably 55 gallon, for shipping to an environmental recycler.

Any capacitors or other devices containing PCB's are removed from the refrigerator or appliance and placed in UN/EPA approved containers for shipment to a waste incinerator.

Interior parts are removed from the refrigerator and sent to a glass bin at 24 or a plastic and metal interior flow conveyor portion 26 for appropriate storage and/or processing. The interior, parts removal may be done on the conveyor portion 18, elevated from the supporting surface 12, or the platform 13 and refrigerator thereon may be lowered to ground level for convenience.

After the interior parts are removed and the platform and refrigerator are at ground level, the refrigerator is moved so as to lay or rest horizontally on the platform 13. The platform 13 and refrigerator are then moved to device 28, such as a large band saw, to break or form the refrigerator into several pieces. The large band saw 28 is sized and dimensioned to enable a large refrigerator or freezer to be easily held therein and be cut into a plurality of pieces or sections. The band saw 28 includes a specifically designed set of pneumatic clamps for securely holding a refrigerator, or the like, during cutting. This clamping device also tilts the refrigerator to approximately 10° from horizontal to allow a saw blade in the band saw to more easily cut the refrigerator into pieces or sections. This tilting also preserves blade life.

The band saw 28 preferably cuts the refrigerator into 3 pieces by making 2 cuts spaced 18" to 24" from both the top and bottom of the refrigerator.

After being cut into 2 or more pieces or sections, each piece or section is taken apart, by machine or manually, by stripping away the metal shell and any interior plastic liner and pulling or scraping the polyurethane foam from the metal and/or plastic.

The metal is sent to a further portion or section 30 of the conveyor to system, where it may be compacted and then collected at 32, for forwarding to a recycler.

The interior plastic liner, together with any other plastic taken from the interior is sent to a plastic chipper 34, where it is shredded into manageable size pieces for sorting, storing, packaging and shipment to a plastic recycler.

The polyurethane foam is packaged at 36 into sealed plastic bags to prevent any further release of CFC-11. The sealed bags are then palletized and shrink wrapped for storage at 38 and eventual shipment to an approved incinerator 40 where the entire pallet and its contents are incinerated at 900° centigrade (Celsius) so that no harmful by-products are produced.

Those skilled in the art will appreciate that various adaptations and modifications of the just-described preferred embodiments may be configured without departing from the scope and spirit of the invention. Therefore, it is to be understood that, within the scope of the appended claims, the invention may be practiced other than is specifically described herein.

What is claimed is:

1. A method of recycling substantially all materials in an appliance, comprising the steps of:
    placing the appliance on a platform in a facility at atmospheric pressure;
    placing the platform and the appliance on and transporting the platform and the appliance along a conveyor system through a plurality of spaced stations, where various materials are removed from the appliance and stored for recycling; and
    wherein the plurality of stations include a station to remove refrigerant, a station to remove oil, at least one station to remove interior parts, and a station having a band saw to saw the appliance into a plurality of pieces.

2. The method of claim 1, including the further steps of stripping a metal shell and interior plastic from the plurality of pieces and removing polyurethane foam.

3. The method of claim 2, including the further steps of placing the removed polyurethane foam into plastic bags, sealing the plastic bags against leakage of CFC-11, and incinerating the plastic bags and the polyurethane foam.

4. The method of claim 2, including the further steps of placing the removed polyurethane foam in sealed plastic bags, placing a plurality of the sealed plastic bags of polyurethane foam on a pallet, and shrink wrapping the pallet and the plurality of the sealed plastic bags of polyurethane foam.

5. The method of claim 4, including the further steps of transporting a plurality of shrink wrapped pallets and sealed plastic bags of polyurethane foam to an incinerator and incinerating each of the shrink wrapped pallets and sealed plastic bags at 900° C.

6. A process to recycle substantially all materials in a refrigerator or freezer, comprising the steps of:
    placing the refrigerator or freezer on a platform in an upright or vertical position in a facility at atmospheric pressure;
    placing the platform and the refrigerator or freezer on and transporting the platform and the refrigerator or freezer along a conveyor system to a plurality of stations;
    removing any Freon from the refrigerator or freezer at a first station;
    drilling a hole in a compressor in the refrigerator or freezer;
    draining any oil from the compressor through the drilled hole at a second station by tilting the platform;
    removing any capacitors from the refrigerator or freezer;
    removing any interior parts from the refrigerator or freezer;
    laying the refrigerator or freezer horizontally on the platform;
    using a band saw to saw the refrigerator or freezer into at least two pieces at a further station; and
    breaking the at least two pieces apart so as to separate any metal, plastic and polyurethane foam.

7. The process of claim 6, including the further steps of placing the separated polyurethane foam in plastic bags, sealing the plastic bags to prevent the leakage of CFC-11, and incinerating the polyurethane foam and the plastic bags.

8. The process of claim 6, including the further steps of placing the removed polyurethane foam in sealed plastic bags, placing a plurality of the sealed plastic bags of polyurethane foam on a pallet, and shrink-wrapping the pallet and the plurality of the sealed plastic bags of polyurethane foam.

9. The process of claim 8, including the further steps of transporting a plurality of shrink-wrapped pallets and sealed plastic bags of polyurethane foam to an incinerator and incinerating each of the shrink-wrapped pallets and sealed plastic bags at 900° C.

10. The process of claim 9, including the further steps of placing the removed Freon and drained oil into containers for shipment to recyclers.

11. The process of claim 9, including the further steps of transporting the removed capacitors, removed interior parts, the separated metal and plastic to storage for further handling.

12. A system to recycle substantially all materials in an appliance, such as a refrigerator or freezer comprising:
    a facility for receiving the appliance; the facility being at atmospheric pressure,
    a platform for supporting the appliance in an upright or vertical position;
    a conveyor system for transporting the platform and appliance in the facility;
    a first station in the facility for removing any Freon from the appliance;
    means in the facility for drilling a hole in a compressor in the appliance;
    means in the facility for draining any oil from the compressor through the drilled hole and storing the oil for shipment;
    means in the facility for removing any interior parts from the appliance and transporting to storage;
    means in the facility for cutting the appliance into at least two pieces;
    means in the facility for tearing the at least two pieces apart so as to separate any metal, plastic and polyurethane foam; and
    means in the facility for transporting the separated metal, plastic and polyurethane foam to separate areas for further handling.

13. The system of claim 12, further including means in the facility for placing the separated polyurethane foam in plastic bags and sealing the plastic bags to prevent leakage of CFC-11 and incinerating the sealed plastic bags of polyurethane foam.

14. The system of claim 12, further including shrink wrapping a plurality of the sealed plastic bags on a pallet and providing an incinerator for incinerating each pallet and plurality of the sealed plastic bags at 900° C.

15. The system of claim 12 wherein the means in the facility for cutting the appliance into at least two pieces is a band saw, sized and dimensioned to receive, hold and saw the appliance into at the least two pieces.

16. The system of claim 13 wherein the means in the facility for draining the oil from the compressor includes a tilting platform that tilts the platform and the appliance thereon.

17. The system of claim 16 wherein the tilting platform is movable approximately 20 degrees.

18. The system of claim 17, further including means in the facility for placing the separated polyurethane foam in plastic bags to prevent leakage of CFC-11.

19. The system of claim 18, further including means in the facility for placing a plurality of the scaled plastic bags on pallets and shrink-wrapping the pallets and the plurality of the sealed plastic bags for shipping.

20. The system of claim 15 wherein the band saw includes a set of pneumatic clamps for securely holding the appliance at an angle of approximately 10° from horizontal.

* * * * *